United States Patent
Vasseur et al.

(10) Patent No.: US 9,847,889 B2
(45) Date of Patent: Dec. 19, 2017

(54) PACKET TRAINS TO IMPROVE PACKET SUCCESS RATE IN CARRIER SENSE MULTIPLE ACCESS NETWORKS

(75) Inventors: Jean-Philippe Vasseur, Saint Martin Duriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

(21) Appl. No.: 13/187,204

(22) Filed: Jul. 20, 2011

(65) Prior Publication Data

US 2013/0022053 A1    Jan. 24, 2013

(51) Int. Cl.
    *H04L 12/28* (2006.01)
    *H04L 12/413* (2006.01)
    *H04L 12/801* (2013.01)

(52) U.S. Cl.
    CPC ............ *H04L 12/413* (2013.01); *H04L 47/10* (2013.01)

(58) Field of Classification Search
    CPC . H04L 12/54; H04L 2012/5629; H04L 47/50; H04L 2012/5678–2012/5684
    USPC .................................. 370/229–240, 310–350
    See application file for complete search history.

(56) References Cited

U.S. PATENT DOCUMENTS

| | | | |
|---|---|---|---|
| 4,503,533 A | 3/1985 | Tobagi et al. | |
| 5,533,025 A | 7/1996 | Fleek et al. | |
| 6,674,738 B1 * | 1/2004 | Yildiz et al. | 370/338 |
| 7,283,483 B2 | 10/2007 | Asawa et al. | |
| 7,724,725 B2 | 5/2010 | Choksi | |
| 7,751,328 B2 | 7/2010 | Kloth | |
| 7,814,542 B1 | 10/2010 | Day | |
| 7,835,371 B2 | 11/2010 | Krischer et al. | |
| 7,889,659 B2 | 2/2011 | Montalvo et al. | |
| 7,970,948 B1 | 6/2011 | Moberg et al. | |
| 2003/0035382 A1 * | 2/2003 | Jose | 370/280 |
| 2004/0095882 A1 * | 5/2004 | Hamzah | H04L 47/10 370/229 |
| 2006/0262759 A1 | 11/2006 | Bahl et al. | |
| 2006/0268690 A1 * | 11/2006 | Palecanda | H04L 47/32 370/229 |
| 2008/0002647 A1 * | 1/2008 | Laroia | H04W 40/244 370/338 |
| 2009/0040981 A1 * | 2/2009 | Agashe | H04L 1/1887 370/331 |

(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).

(Continued)

*Primary Examiner* — Andrew Chriss
*Assistant Examiner* — Kenan Cehic
(74) *Attorney, Agent, or Firm* — Parker Ibrahim & Berg LLC; James M. Behmke; Stephen D. LeBarron (57) ABSTRACT

In one embodiment, a communication device operates according to a particular frequency hopping sequence in a communication network, and receives a first packet with an indication that the first packet is part of a particular packet train, the packet train comprising a plurality of packets to be transmitted in succession. Accordingly, the communication device prevents transmission until receiving a final packet of the packet train, and stores received packets of the particular packet train while preventing the transmission.

20 Claims, 10 Drawing Sheets

(56) References Cited

U.S. PATENT DOCUMENTS

2009/0307553 A1* 12/2009 Umesh et al. ............... 714/748
2010/0254312 A1* 10/2010 Kennedy ...................... 370/328
2010/0302997 A1* 12/2010 Park et al. ................... 370/315
2011/0273983 A1* 11/2011 Bergamasco et al. ....... 370/232
2012/0155284 A1*  6/2012 Shaffer et al. ............... 370/242

OTHER PUBLICATIONS

Kastlova, et al., "Notification of Transmittal of the International Search Report and the Written Opinion of the International Searching Authority, or the Declaration", Patent Cooperation Treaty, dated Oct. 18, 2012, 13 pages, PCT/US2012/047599, European Patent Office, Rijswijk, Netherlands.

Sobrinho, et al., "Quality-of-Service in Ad Hoc Carrier Sense Multiple Access Wireless Networks", IEEE Journal on Selected Areas in Communications, vol. 17, No. 8, Aug. 1999, pp. 1353-1368, IEEE, Piscataway, New Jersey.

Offiical Action dated Feb. 6, 2015 in connection with European Application No. 12 741 442.3.

Examiners Report dated May 29, 2015 in connection with Canadian Application No. 2,841,975.

* cited by examiner

PACKET TRAINS TO IMPROVE PACKET SUCCESS RATE IN CARRIER SENSE MULTIPLE ACCESS NETWORKS

TECHNICAL FIELD

The present disclosure relates generally to communication networks, and, more particularly, to carrier sense multiple access (CSMA) frequency hopping networks.

BACKGROUND

In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. That is, to communicate a message, the transmitter must transmit the message according to the receiver's frequency hopping schedule. Note that the transmitter will often need to transmit the message on a channel different from its own receiving schedule.

Many communication devices, particularly in low-power and lossy network (LLNs), typically communicate using only a single transceiver due to cost or energy constraints. Most narrow band transceivers in use today can only be configured to transmit or receive on a single channel at a time. That is, while configured for a particular channel, the transceiver cannot transmit or receive on any other channel, and since transceivers are typically half-duplex, they do not have the ability to transmit and receive at the same time.

Because a narrow-band transceiver is limited to a single channel and is half-duplex, determining the cause of a packet drop effectively in a carrier sense multiple access (CSMA)-based network can be challenging. In particular, when a device "A" fails to receive an acknowledgment from a device "B," it does not know if the transmission was lost due to link quality issues or simply because device B was tuned to a different channel and/or transmitting at the same time. Also, though CSMA-based systems typically employ random backoffs and clear-channel assessment mechanism to help avoid collisions, in a frequency hopping system, the traditional clear-channel assessment mechanism no longer applies.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a communication device operates according to a particular frequency hopping sequence in a communication network, and receives a first packet with an indication that the first packet is part of a particular packet train, the packet train comprising a plurality of packets to be transmitted in succession. Accordingly, the communication device prevents transmission until receiving a final packet of the packet train, and stores received packets of the particular packet train while preventing the transmission.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

Figure 1:
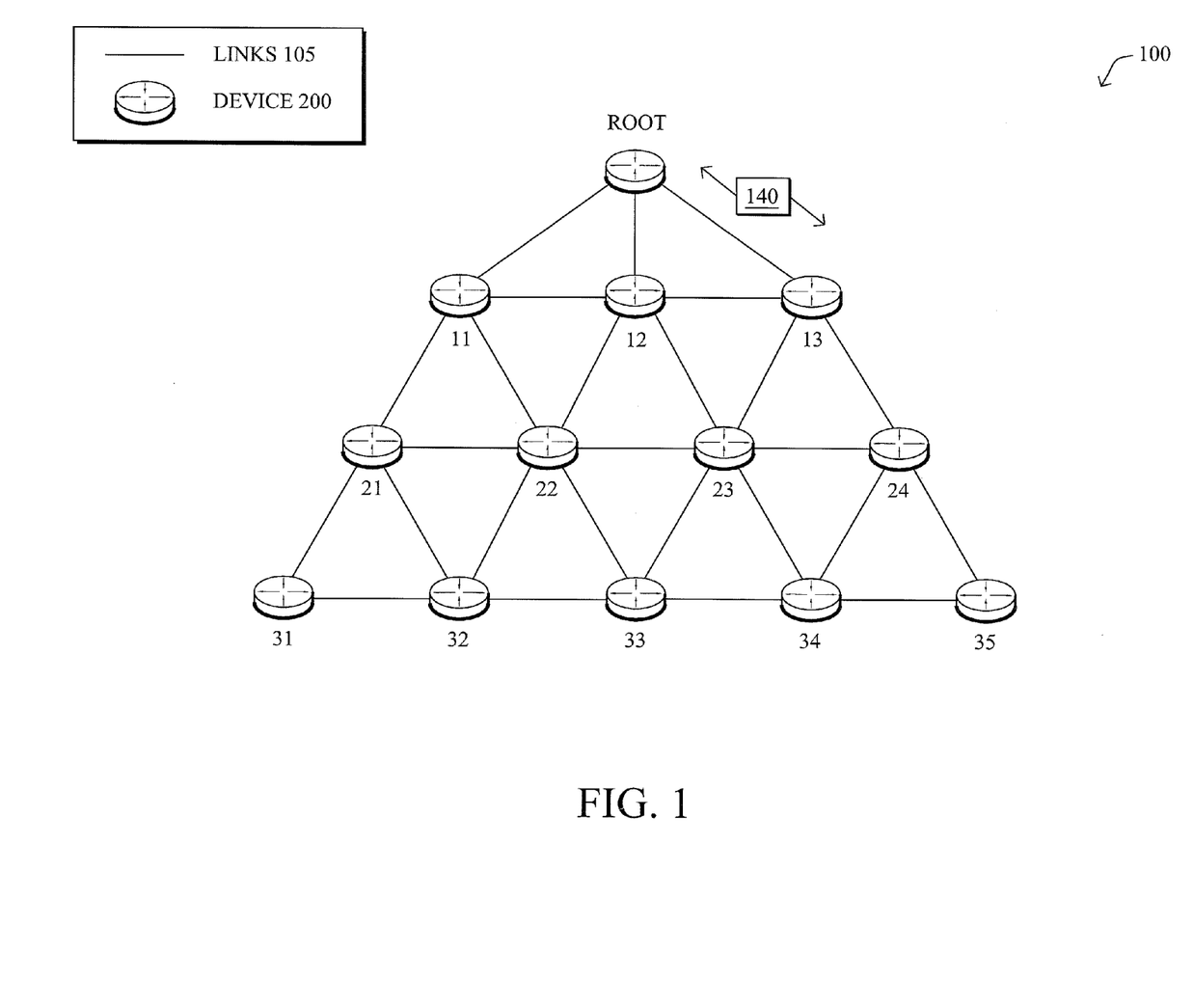
FIG. 1 illustrates an example shared-media communication network.

FIG. 1 is a schematic block diagram of an example computer network 100 (e.g., wireless or otherwise) illustratively comprising nodes/devices 200 (e.g., labeled as shown, "root," "11," "12," . . . "35"), which are interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
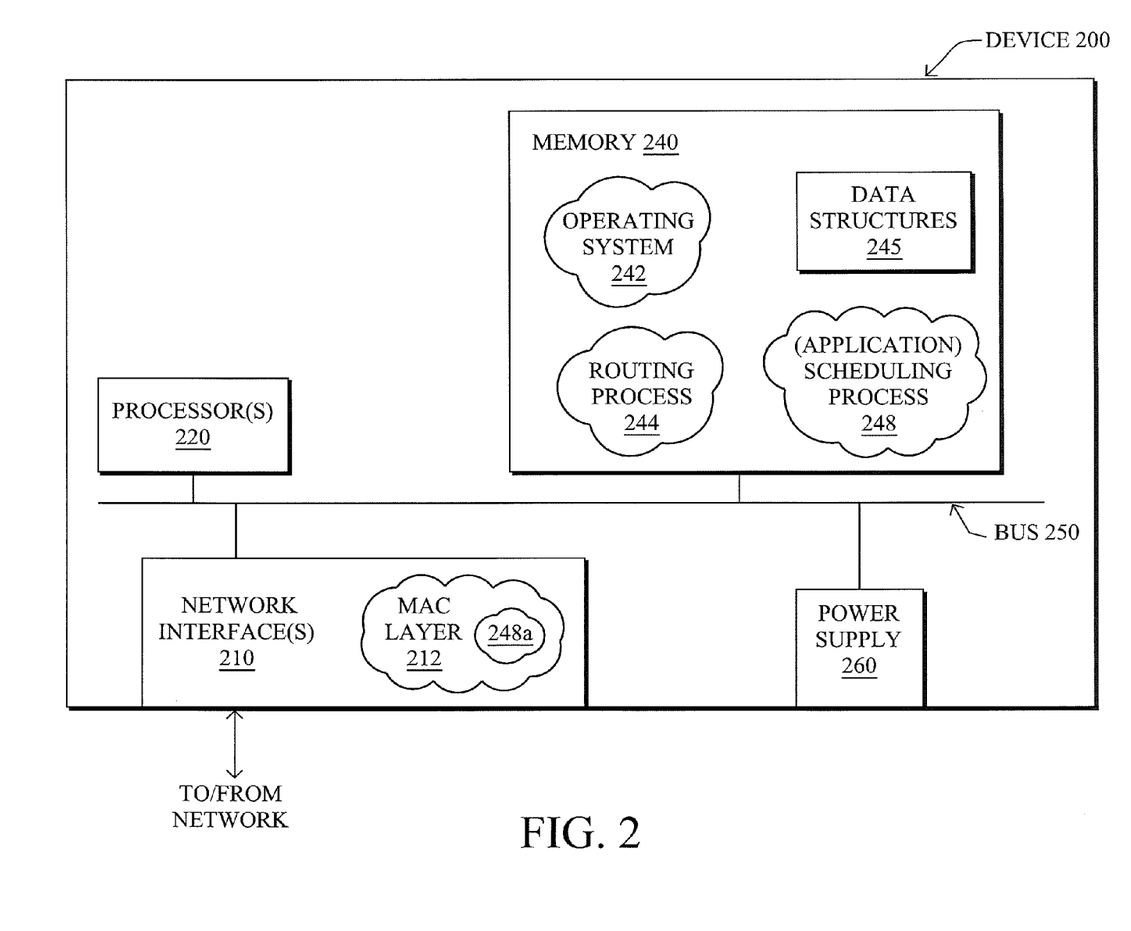
FIG. 2 illustrates an example device/node.

FIG. 2 is a schematic block diagram of an example node/device 200 that may be used with one or more embodiments described herein, e.g., as any of the nodes in FIG. 1 above. The device may comprise one or more network interfaces 210 (e.g., wireless/frequency-hopping), at least one processor 220, and a memory 240 interconnected by a system bus 250, as well as a power supply 260 (e.g., plug-in, battery, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "scheduling" process 248 as described in greater detail below. Note that while scheduling process 248 is shown in centralized memory 240, alternative embodiments provide for the mode selection process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a to mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
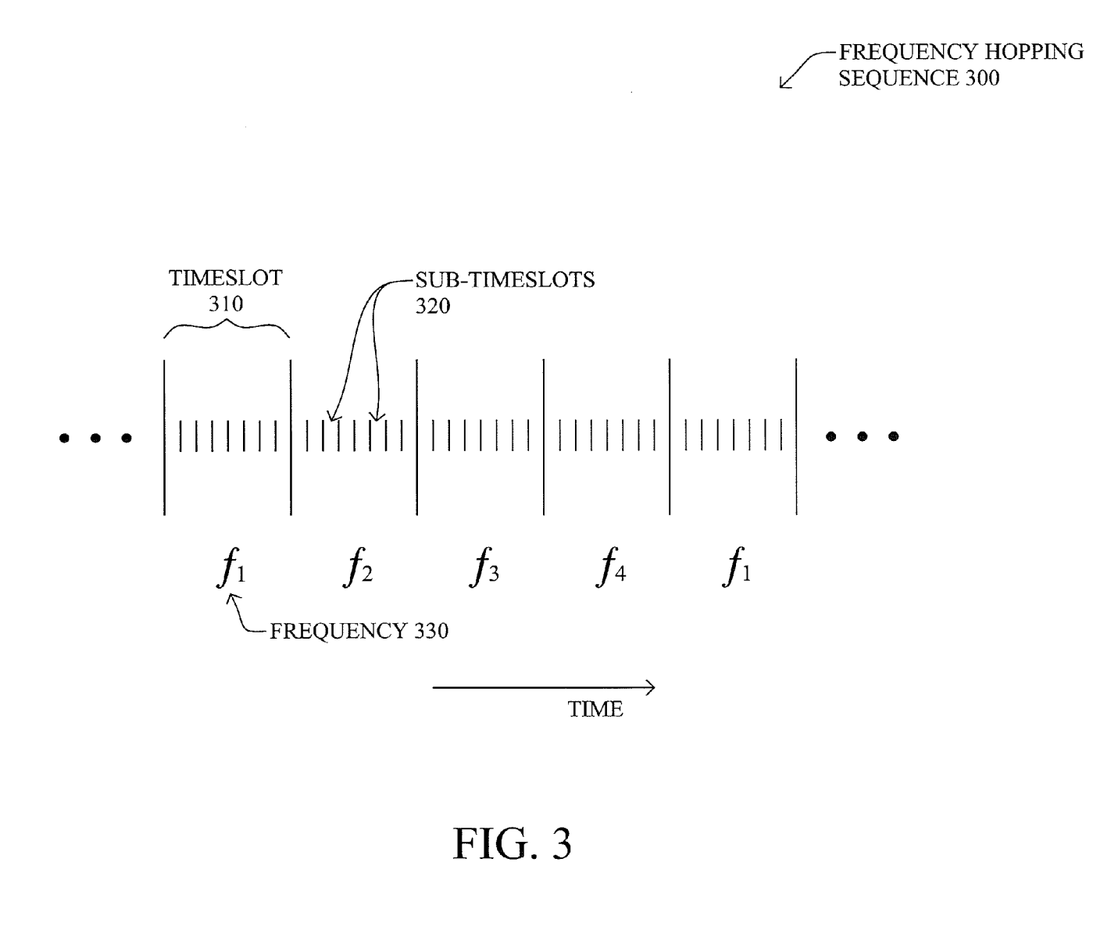
FIG. 3 illustrates an example frequency hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, one objective of which generally being scheduling of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Carrier sense multiple access (CSMA) is a probabilistic MAC protocol in which a node verifies the absence of other traffic before transmitting in a shared-media communication network. Carrier sensing, in particular, directs a network interface to detect whether a carrier wave (the presence of another transmission from another device) is present on the shared-media network before trying to transmit. If a carrier is sensed, the device waits for the transmission in progress to finish before initiating its own transmission.

Figure 4A:
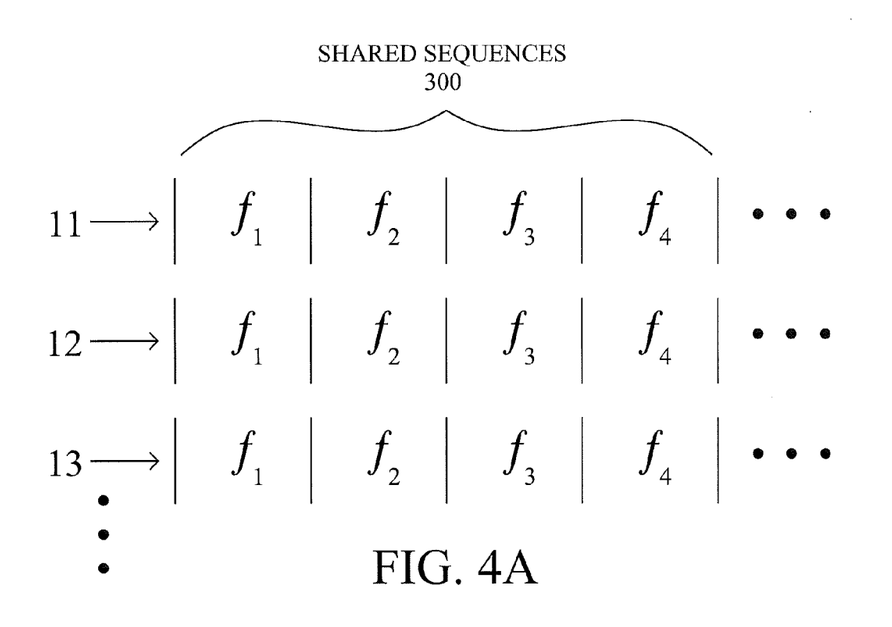
FIGS. 4A-4C illustrate another example of frequency hopping sequences.

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (e.g., shown for nodes 11, 12, and 33) are all configured with the same sequence (assume also that the other nodes of the network 100 use the same sequence).

Figure 4B:
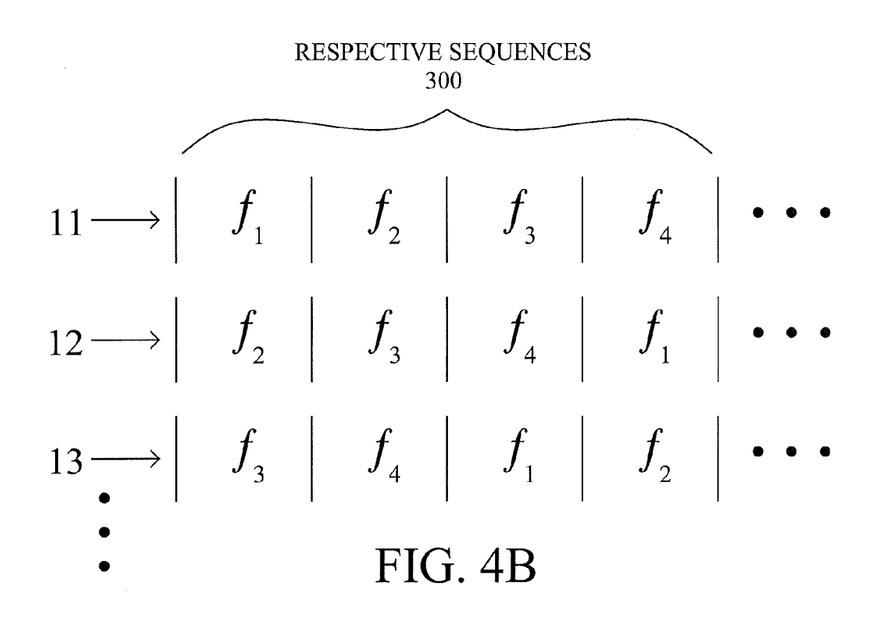

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

Figure 4C:
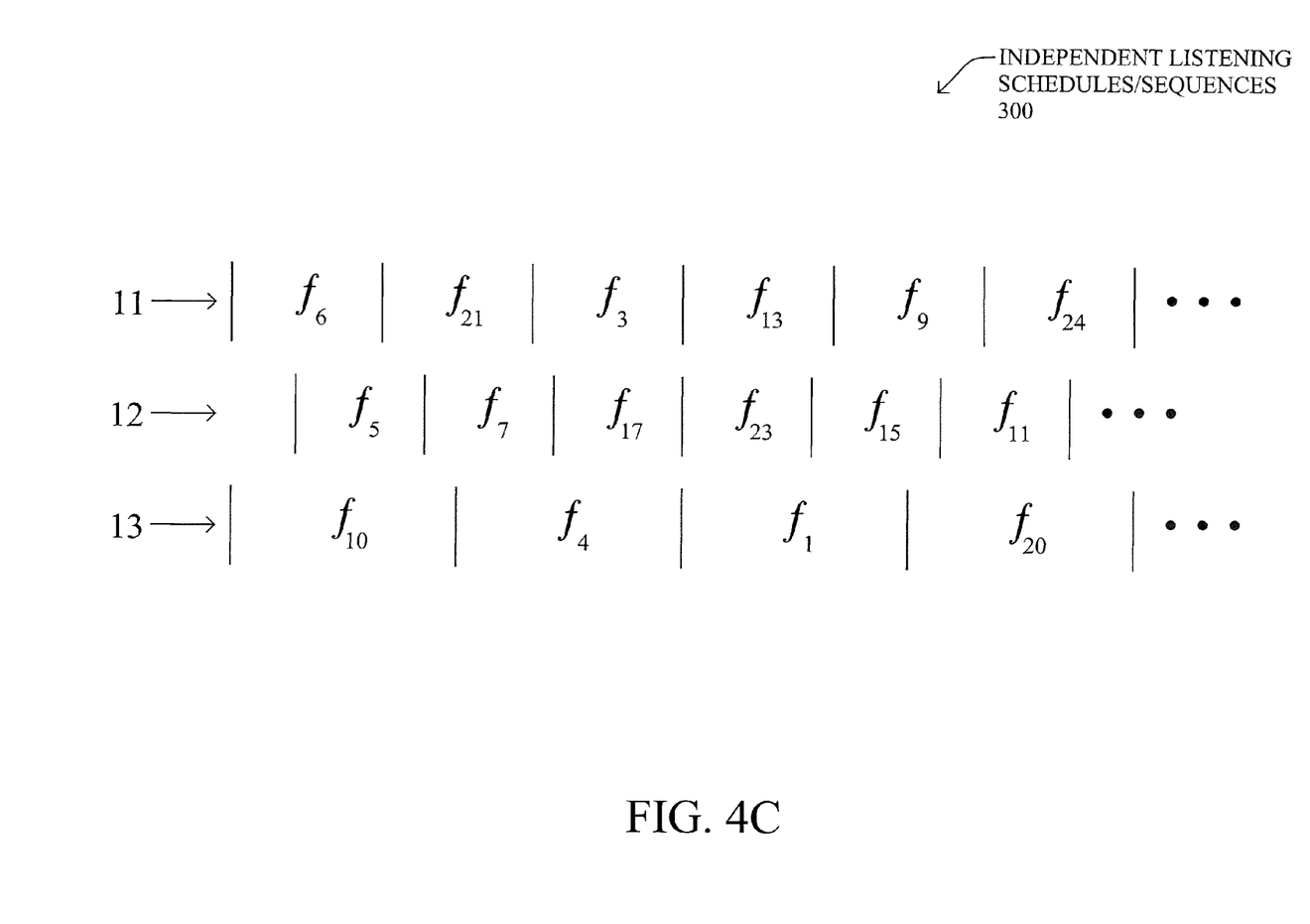

Note that the offset of the frequencies in FIG. 4B (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other. For example, FIG. 4C illustrates another example of independently determined listening schedules 300 that may be computed by each individual device in the network 100 (again, only nodes 11, 12, and 13 are shown for brevity). Note how there is generally no overlap at any given time (a goal of a typical scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, many communication devices, particularly in LLNs, typically communicate using only a single transceiver due to cost or energy constraints, which generally can only be configured to transmit or receive on a single channel at a time. Because a narrow-band transceiver is limited to a single channel and is half-duplex, determining packet loss reasons (and metrics, such as "ETX," an expected transmission count to reach a destination) effectively in a CSMA-based network can be challenging. In particular, when a device, e.g., node 31, fails to receive an acknowledgment from another device, e.g., node 21, it does not know if the transmission was lost due to link quality issues or simply because node 21 was tuned to a different channel and/or transmitting at the same time. Note that these challenges do not exist in time division multiple access (TDMA)-based networks because in TDMA networks transmissions are scheduled across all transmitter-receiver pairs in the network in a way that guarantees no such collisions will occur. However, compared to CSMA-based systems, TDMA-based systems incur additional overhead for synchronization and scheduling and are less flexible to changing conditions.

CSMA-based systems typically employ random backoffs and clear-channel assessment mechanism to help avoid collisions. However, in a channel-hopping system, the traditional clear-channel assessment mechanism no longer applies. In particular, consider a simplified portion of network 100 comprising nodes 31->21->11, where node 31 is forwarding packets to node 21 and node 21 is forwarding packets to node 11. Because a CSMA-based network allows devices to begin transmission at any time, both node 31 and node 21 may choose to begin forwarding packets simultaneously. In a single-channel network, node 31 can utilize clear-channel assessment techniques to detect whether or not node 21 is already attempting to forward a packet to node 11. However, in a channel-hopping network, node 31 and node 21 may be transmitting on different channels. Furthermore, because the channel-hopping sequence is local to each transmitter receiver pair (i.e., the channel-hopping sequence for sending packets to node 21 is different than for sending packets to node 11), node 31 may not know what channel node 21 is transmitting on. As a result, the clear-channel assessment is no longer useful to detect whether or not node 21 is currently transmitting a message. Furthermore, node 31 may not hear the packet sent by node 21 to 11, even if they were using the same channel.

This challenge is compounded by the fact that when node 31 transmits a message to node 21 and receives no acknowledgment, node 31 does not know the cause of the packet drop. In particular, node 31 does not know if there was simply a transmission failure (e.g., due to external interference or temporary fading) in the data or acknowledgment packet or if node 21 was simply busy transmitting on a different channel.

Certain existing systems synchronize the entire network to the same channel-switching schedule, where all nodes to receive on the same channel at the same time, and the entire network hops together in lock-step. While this first system is optimized for broadcast, it does not allow frequency diversity for unicast where different pairs of nodes may communicate at the same time on different channels. In a second example system, both unicast and broadcast slots may be utilized, where a central gateway device computes the hopping schedule for each transmitter-receiver pair, and the schedules are distributed using the wireless network. Because communication in this second system is explicitly scheduled (e.g., TDMA-based systems), an intended receiver of a transmitted message will never be busy transmitting at the same time as the message is being transmitted. However, compared to CSMA-based systems, this scheduled system incurs additional synchronization and scheduling overhead, and is less flexible to changing conditions.

Packet Trains

The techniques described herein reduce packet drops and/or collisions in a CSMA frequency-hopping network generally due to the intended receiver being busy transmitting, e.g., on a different channel. In particular, as described herein, chains of successively transmitted packets may be marked as being within a "packet train," and devices receiving a packet train may thus temporarily suspend their transmissions until completion of the packet train.

Specifically, according to one or more embodiments of the disclosure as described in greater detail below, communication devices operate according to a particular frequency hopping sequence in a communication network, and may receive a first packet with an indication that the first packet is part of a particular packet train, the packet train comprising a plurality of packets to be transmitted in succession. Accordingly, the receiving communication device prevents transmission until receiving a final packet of the packet train, and stores received packets of the particular packet train while preventing the transmission.

Illustratively, the techniques described herein may be performed by hardware, software, and/or firmware, such as in accordance with scheduling process 248 and/or MAC layer module 212 (248*a*), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

Operationally, at a high level, the techniques herein involve forwarding multiple packets as if they were a single unit (i.e., a "packet train") hop-by-hop. Typical Smart Grid applications, for example, utilize packet trains of various lengths. They may consist of a single packet (e.g., alarms, on-demand single reads, etc.) or many packets (e.g., large load curves, etc.). In certain systems, for instance, electric meters may report single reads that fit within a single packet. However, on occasion, the head-end system may request any missed reads (e.g., due to packet drops) to be transmitted all at once, and the missed reads are thus aggregated and can consist of several packets. Electric meters also log data in addition to the electric meter readings and, on occasion, the head-end system may request these logs. The size of these logs typically range from 1 KB (kilobytes) to a few tens of KBs.

Figure 5:
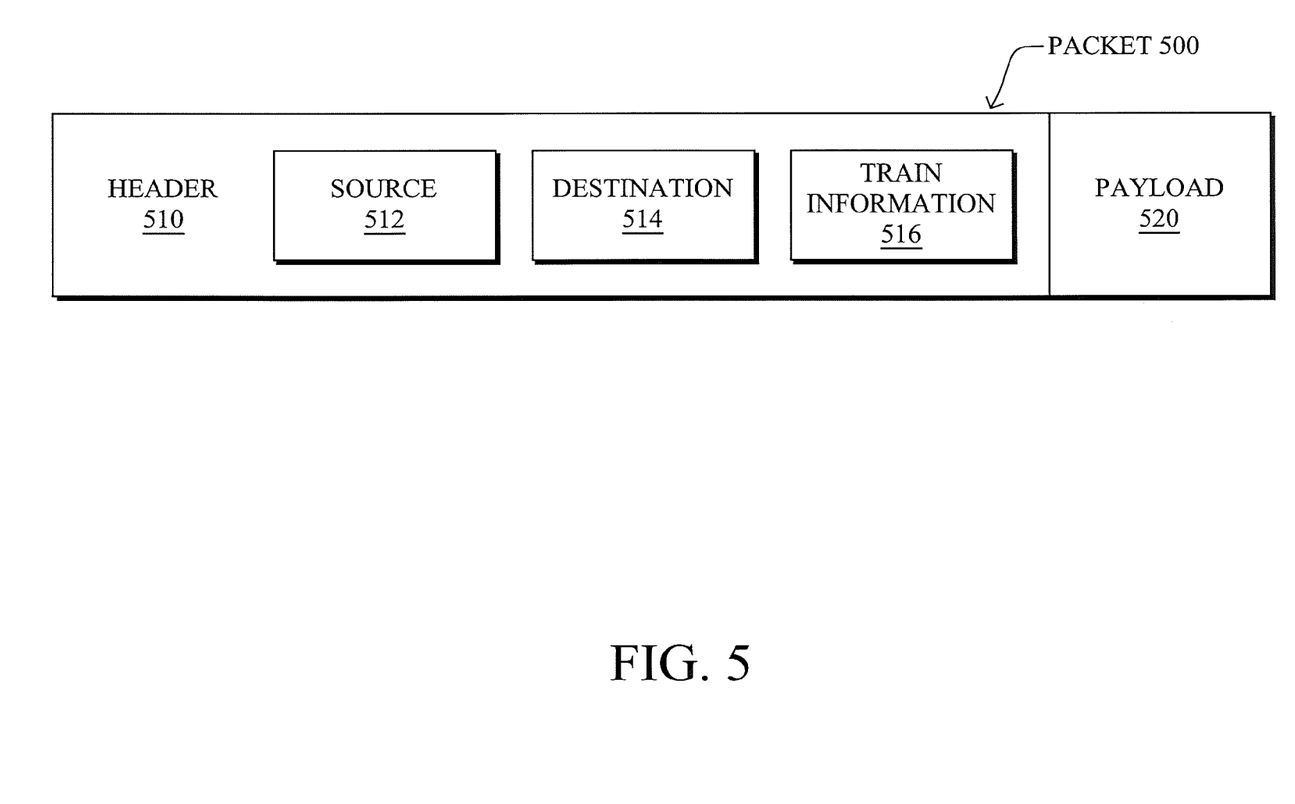
FIG. 5 illustrates an example packet format.

According to the techniques herein, a device determining an intention to transmit a packet train may mark corresponding packets 140 with an indication of the packet train. For instance, FIG. 5 illustrates an example packet format (hereinafter "packet 500"), which comprises, generally, at least one header 510 and a payload 520, as may be appreciated by those skilled in the art. Illustratively, the header 510 may comprise one or more fields used to forward the packet, such as a source 512 and destination 514 (or other labels, checksums, etc.). In addition, according to the techniques herein, an illustrative "train information" field 516 may also be included within the header (e.g., an additional field, an extension header, etc.). For example, the marking may be completed using the IPv6 Flow Label, an IPv6 Hop-by-Hop Option, IEEE 802.15.4 Information Element, etc.

Illustratively, the sender may mark a first packet of the packet train with an indication of the start of the packet train, and may also mark a final packet of the packet train with an indication of the end of the packet train (i.e., indicating whether or not the packet is the last packet within a train). In certain embodiments, each packet of the train may also be marked, though in other embodiments, a receiver may assume that a train continues until receiving a final-marked packet, accordingly. In addition, in a particular embodiment, the marking of the final packet in a packet train may, in fact, be the absence of a marking, thus the marking 516, when present, is an indication that another successively transmitted packet should be expected. Furthermore, in one or more further embodiments, the associated application source (scheduling process 248, which, notably, may be embodied as a specifically purposed application) marks different packet trains using different identifiers, and thus may mark all packets within the same packet train using the same identifier.

Without any additional mechanisms, a CSMA-based frequency hopping systems can have significant inefficiencies when forwarding a packet train. In particular, after node 31 transmits the first packet of a train to node 21, node 21 may choose to forward that particular packet further to node 11. However, because node 21 is transmitting on a different channel unknown to node 31, node 31 will fail to forward additional packets in the train until nod 21 has finished transmitting the first packet, as noted above. These inefficiencies consume unnecessary channel capacity, communication delay, and lower link success rate metric and lead to several channel inefficiencies.

By marking packet trains, devices receiving the trains can delay transmissions (e.g., further forwarding of the packets in the train) until it has attempted to receive all packets within the train from the sender. That is, if the packet marking 516 indicates that the train has additional packets, the receiving device will continue to wait and buffer the additional packets in the train.

Figure 6:
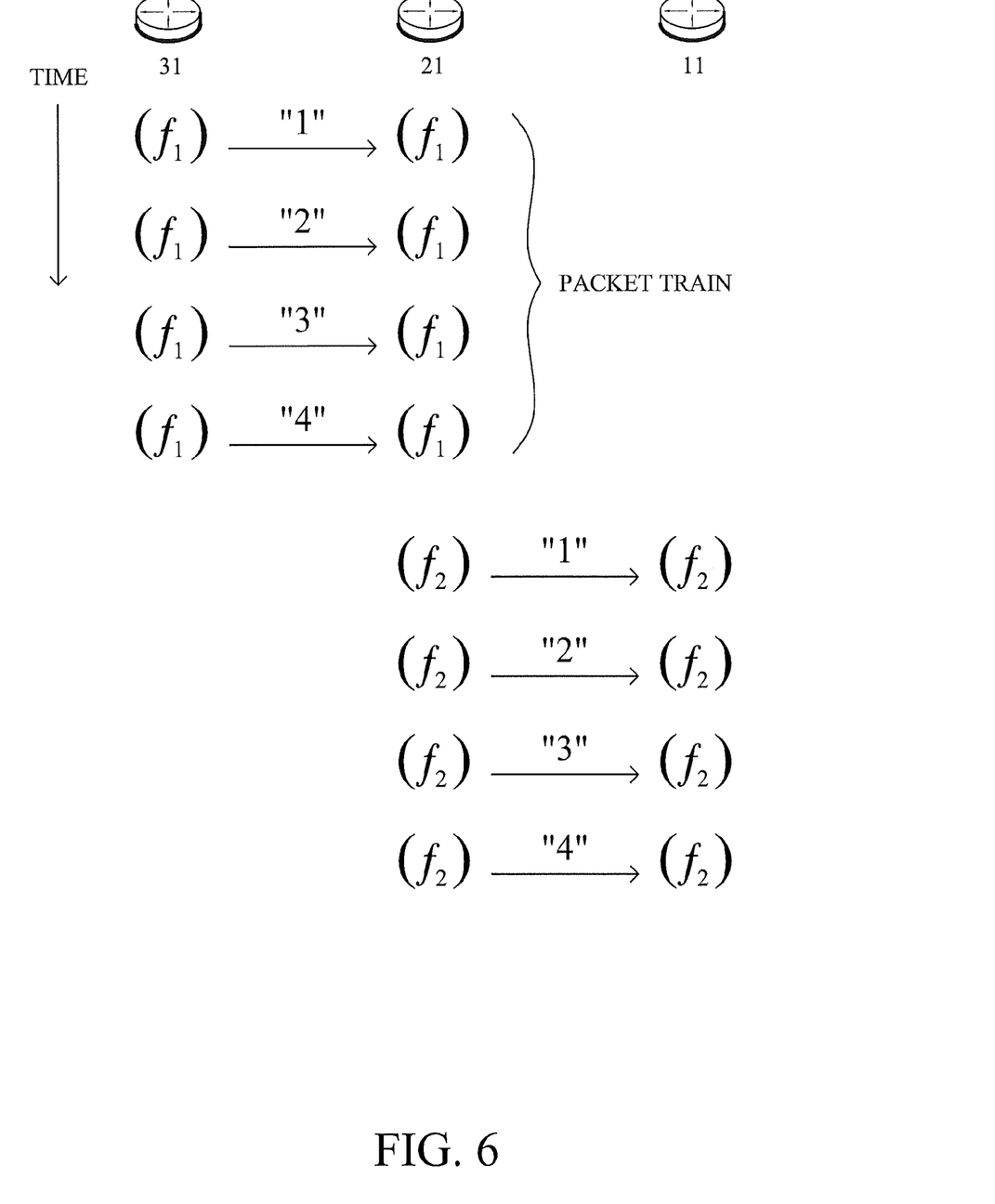
FIG. 6 illustrates an example packet train transmission.

FIG. 6 illustrates an example packet train transmission in accordance with one or more embodiments herein. In particular, a sending node (e.g., node 31) may transmit a first packet "1" to the next-hop communication device (receiving device, e.g., node 21) with an indication that it is the first packet of a particular packet train. As such, the receiving node prevents further transmissions (e.g., forwarding of the received packets of the train) until receiving a final packet of the packet train. As each successively transmitted packet is received ("2," "3," and "4"), the receiving device stores/buffers the received packets, accordingly. After receiving the last/final packet within the train, the receiving device may then initiate transmission, such as beginning to forward the packets "1" through "4" to the next-hop communication device (e.g., node 11), for example, with an indication that the packets are part of a packet train. As a result, it is much less likely for node 21 to be busy transmitting when node 31 continues to forward the remaining packets in a packet train.

As shown in FIG. 6, during the transmission of a packet train, the two participatory devices (e.g., nodes 31 and 21 and then nodes 21 and 11) may remain on a same frequency for a duration of the packet train. In an alternative embodiment, the packet transmissions may proceed to follow the pre-established hopping schedule 300, such that if a next packet is to be forwarded in a subsequent timeslot, then that timeslot's frequency is accordingly used. That is, node 21 will generally stay in listening mode and may switch to a different frequency according to the listening schedule that it provided to 31 for all packets of the train. For example, assume that packets "3" and "4" from node 21 and 11 could use a frequency $f_7$, for example, rather than $f_2$ the entire time.

In the event a receiving device's memory gets full, i.e., crossing some memory overrun threshold, then the receiving device may not be able to receive all of the packets within a single train. In this instance, the receiving device, e.g., node 21, may begin forwarding the currently stored packets to a next-hop device, e.g., node 11. While node 31 was not able to finish a full packet train, it was at least able to take advantage of the optimization for a portion of the packet train.

Figure 7:
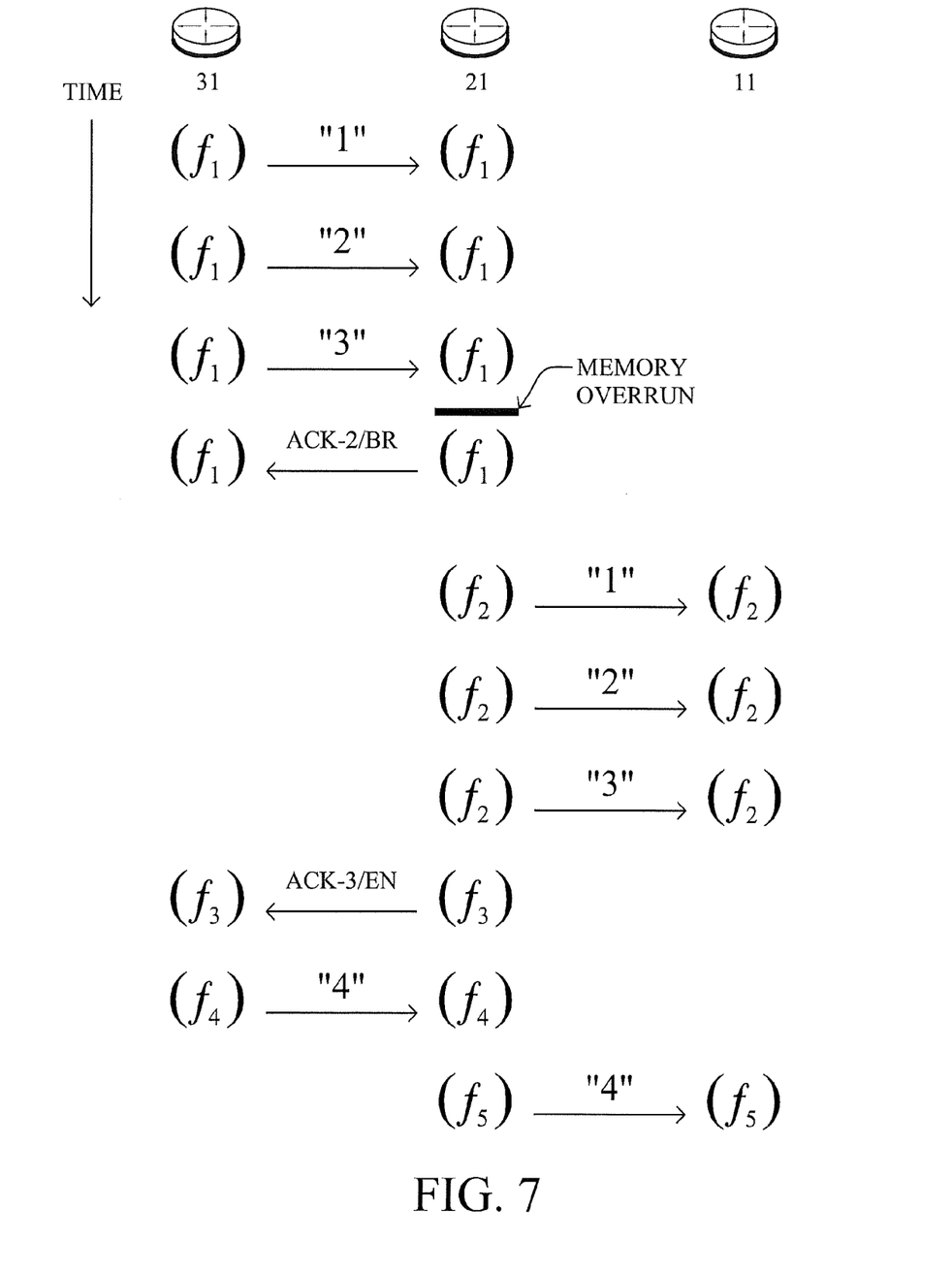
FIG. 7 illustrates another example packet train transmission.

FIG. 7 illustrates another example packet train transmission, particularly where memory limitations exist during transmission/reception of the packet train. In particular, if during the train (e.g., at packet "3"), the receiving device node 21 stores a maximum amount of packets for the packet train, then in response node 21 can initiate processing (e.g., transmission/forwarding) of the packets up to that point, e.g., packets "1," "2," and "3." Note that in one embodiment, e.g., as shown in FIG. 7, the receiving device (e.g., node 21) may return a request to a sender of the packet train (e.g., to node 31) that the sender buffer additional packets of the packet train (a "buffer request" or "BR" as shown). For example, receiving device may send a layer-2 acknowledgment ("ACK") for the penultimate received packet ("2") with a newly specified bit set so as to activate some flow control, thus effectively requesting the sender to start buffering itself. Once the sufficient memory has been freed up, the node acknowledges the last received packet ("3"), thus indicating that it is again ready to receive packets. In another embodiment, the buffer request may explicitly indicate how long to buffer by indicating a length of time in the request, or else may send an explicit notice ("EN") to the sender in response to buffering no longer being requested. Once triggered, the sending device resumes transmitting of the packet train (e.g., packet "4"), accordingly.

Note further that if it is determined prior to receiving the final packet for the packet train that a threshold length of time has passed since a last packet for the packet train was received, the receiving device can either assume that the packet train is completed, or else may assume that the packet train is experiencing packet loss. In either event, the receiving device may process/transmit the packets after this threshold length of time, and may also report an error condition to the sender (or else the sender may detect the error through a lack of acknowledgments). Note that in one embodiment, the receiver may also choose to report the error and not start transmitting, so that the previous sender may attempt to finish sending the "broken" train, at which point the receiving device will start transmitting. Particularly, this alternative is useful where the receiving device starts transmitting right away, and the previous sender attempts to retransmit the lost packet(s), thus leading to another packet loss.

Figure 8:
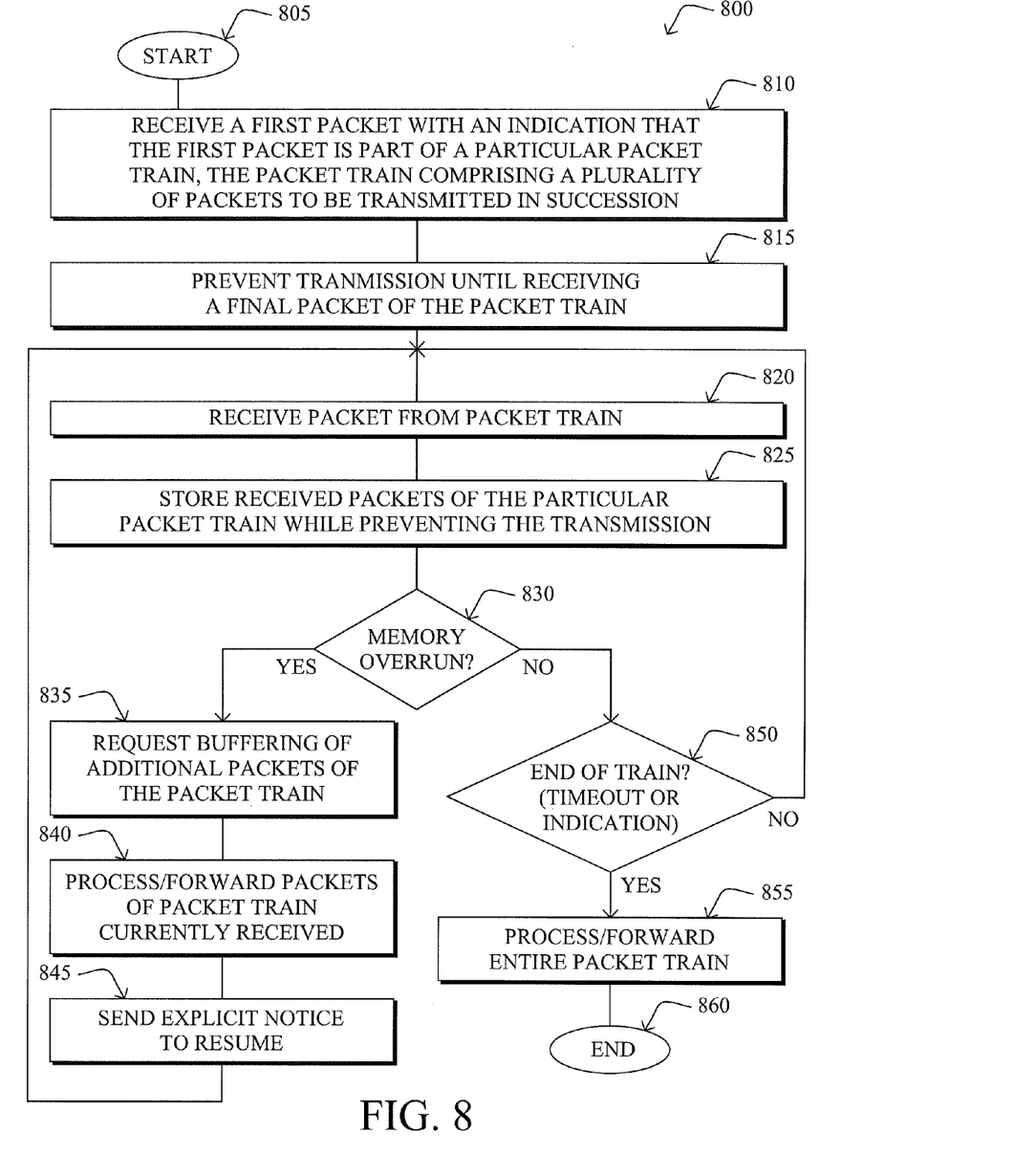
FIG. 8 illustrates an example simplified procedure for providing packet trains to improve packet success rate in CSMA frequency hopping networks, e.g., from the perspective of the receiving device.

FIG. 8 illustrates an example simplified procedure for providing packet trains to improve packet success rate in CSMA frequency hopping networks in accordance with one or more embodiments described herein, e.g., from the perspective of the receiving device. The procedure 800 starts at step 805, and continues to step 810, where, as described in detail above, a device (e.g., node 21) receives a first packet 500 (e.g., from node 31) with an indication (516) that the first packet is part of a particular packet train, the packet train comprising a plurality of packets to be transmitted in succession. As such, in step 815, the device prevents transmission until receiving a final packet of the packet train, accordingly, as it receives packets from the packet train in step 820 and stores them in step 825.

In the event of a memory overrun in step 830 as described above, then in step 835 the receiving device may request buffering of additional packets of the packet train, and processes (e.g., forwards) the packets of the packet train currently received. Once complete, the receiving device may send an explicit notice to the sender to resume transmission of the packet train in step 845. Alternatively, the receiving device may simply await the expiration of a timer before receiving additional packets of the packet train.

Once the end of the packet train is reached in step 850, e.g., due to an indication of a final packet or else a timeout condition, as described above, then in step 855 the receiving device may process the entire (or the rest of the) packet train, such as by forwarding it to a next-hop device (e.g., node 11).

The procedure 800 then illustratively ends in step 860.

Figure 9:
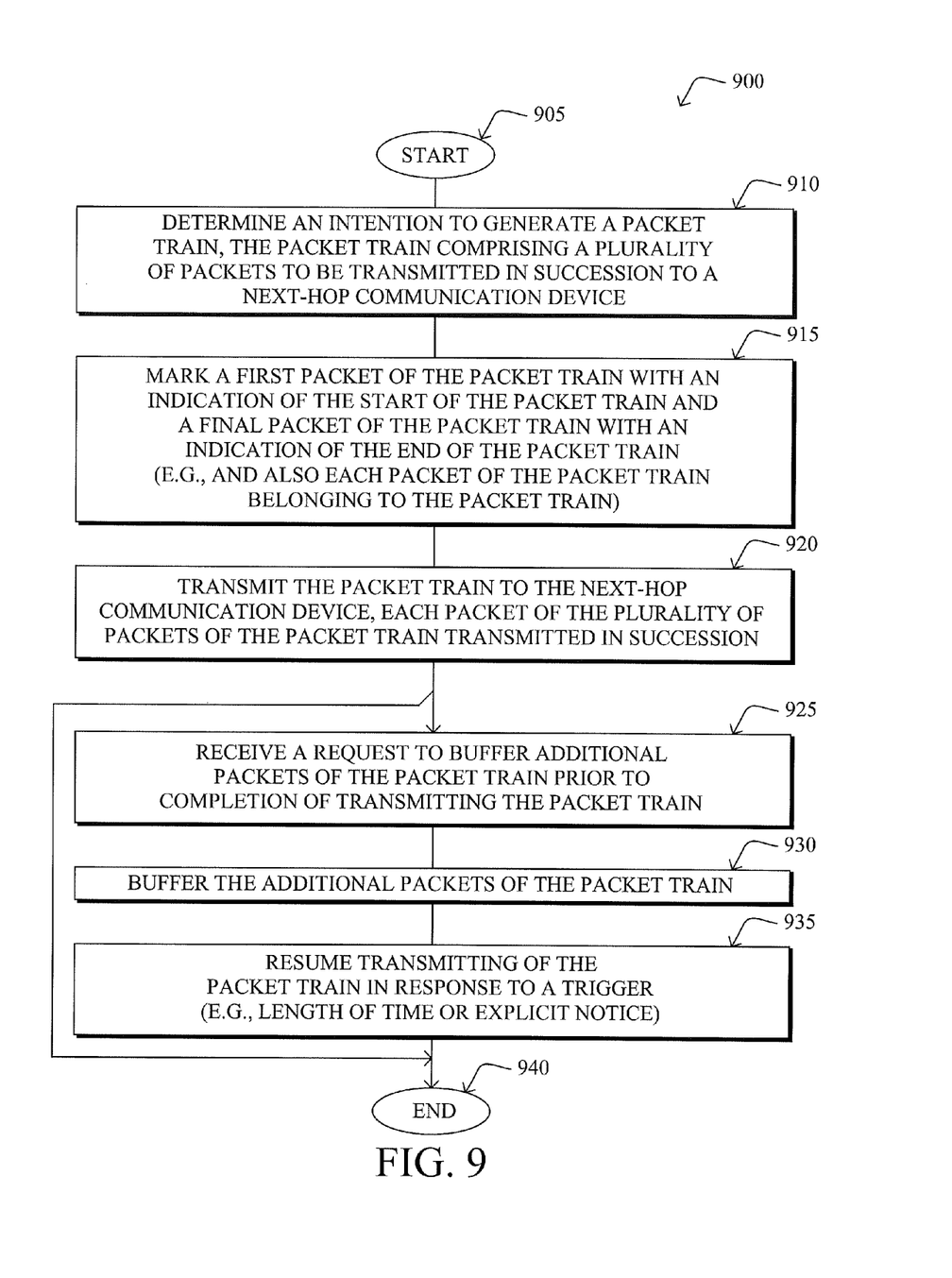
FIG. 9 illustrates an example simplified procedure for providing packet trains to improve packet success rate in CSMA frequency hopping networks, e.g., from the perspective of the transmitting device.

In addition, FIG. 9 illustrates an example simplified procedure for providing packet trains to improve packet success rate in CSMA frequency hopping networks in accordance with one or more embodiments described herein, e.g., from the perspective of the transmitting device. The procedure 900 starts at step 905, and continues to step 910, where, as described in detail above, a sending device, e.g., node 31, determines an intention to generate a packet train, the packet train comprising a plurality of packets to be transmitted in succession to a next-hop communication device, e.g., node 21. As such, in step 915 the device marks a first packet of the packet train with an indication of the start of the packet train and a final packet of the packet train with an indication of the end of the packet train. In addition, as mentioned above, the device may also mark each packet of the packet train as belonging to the packet train. In step 920, the device may then transmit the packet train to the next-hop communication device, each packet of the plurality of packets of the packet train transmitted in succession. Note that each marking may occur just prior to transmitting the respective packet 500, and not necessarily all at once up front.

At this point the procedure may either end in step 940, or else prior to completion of transmitting the packet train the sending device may receive a request to buffer additional packets of the packet train in step 925. As such, the device may buffer the additional packets of the packet train in step 830 until resuming the transmitting of the packet train in step 835 in response to a trigger (e.g., length of time or explicit notice), as described above.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The novel techniques described herein, therefore, provide for packet trains to improve packet success rate in CSMA frequency hopping networks. In particular, by marking chains of successively transmitted packets as being within a packet train, and thus temporarily suspending transmissions while receiving a packet train, the techniques herein reduce packet drops and/or collisions in a CSMA frequency-hopping network generally due to the intended receiver being busy transmitting, e.g., on a different channel. Note that any apparent buffering delay due to memory overruns is compensated by the reduction in the number of dropped packets, retransmissions, associated backoffs, and bias in packet success rate metrics used for routing with current mechanisms.

While there have been shown and described illustrative embodiments that provide for packet trains to improve packet success rate in CSMA frequency hopping networks, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description is specifically discussed CSMA, the use of CSMA is not meant to be tied to any particular known protocol, but instead to the general concept of carrier sensing in shared-media networks, as may be appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
operating a half-duplex communication device according to a particular frequency hopping sequence in a communication network, the particular frequency hopping sequence including a transmit sequence of frequencies used to transmit data to a next-hop device that differs from a receive sequence of frequencies used to receive data from a source device, wherein the transmit sequence is negotiated with the next-hop device independent of the receive sequence and is not shared with the source device, and wherein the communication device is not able to transmit and receive at the same time;
receiving, at the communication device and using the receive sequence of frequencies, a first packet from the source device with an indication that the first packet is part of a particular packet train, the packet train comprising a plurality of packets to be transmitted in succession;
preventing, at the communication device, transmission of all packets to the next-hop device using the transmit sequence of frequencies until receiving a final packet of the packet train;
storing, at the communication device, received packets of the particular packet train while preventing the transmission; and
forwarding, by the communication device, the stored packets of the packet train to the next-hop device.

2. The method as in claim 1, further comprising:
indicating, by the communication device, to the next-hop device that the forwarded packets are part of a packet train.

3. The method as in claim 1, further comprising:
receiving, at the communication device, a final packet of the particular packet train, wherein the communication device forwards the stored packets of the packet train to the next-hop device in response to receiving the final packet of the packet train.

4. The method as in claim 1, further comprising:
storing a maximum amount of packets for the packet train at the communication device, wherein the communication device forwards the stored packets of the packet train to the next-hop device in response to storing the maximum amount of packets for the packet train.

5. The method as in claim 4, further comprising:
requesting, by the communication device, that the source device buffer additional packets of the packet train.

6. The method as in claim 5, wherein requesting comprises:
indicating to the source device how long to buffer the additional packets of the packet train by one or more of: indicating a length of time during which the additional packets should be buffered or sending an explicit notice to the source device that buffering of the additional packets of the packet train is no longer requested.

7. The method as in claim 1, further comprising:
determining, by the communication device, prior to receiving a final packet of the packet train, that a threshold length of time has passed since a packet of the packet train was last received by the communication device, wherein the communication device forwards the stored packets of the packet train to the next-hop device in response to determining that the threshold length of time has passed since the last packet of the packet train was last received by the communication device.

8. The method as in claim 1, further comprising:
remaining, by the communication device, on a same frequency for a duration of the packet train.

9. The method as in claim 1, wherein the particular frequency hopping sequence is independent per device in the communication network.

10. An apparatus, comprising:
a processor;
a half-duplex transceiver configured to communicate in a frequency hopping communication network according to a frequency hopping schedule, the frequency hopping schedule including a transmit sequence of frequencies used to transmit data to a next-hop device that differs from a receive sequence of frequencies used to receive data from a source device, wherein the transmit sequence is negotiated with the next-hop device independent of the receive sequence and is not shared with the source device, and wherein the transceiver is not able to transmit and receive at the same time; and
a memory configured to store a process executable by the processor, the process when executed by the processor operable to:
receive a first packet from the source device using the receive sequence of frequencies with an indication that the first packet is part of a particular packet train, the packet train comprising a plurality of packets to be transmitted in succession;
prevent transmission of all packets to the next-hop device using the transmit sequence of frequencies until receiving a final packet of the packet train;
store received packets of the particular packet train while preventing the transmission; and
forward the stored packets of the packet train to the next-hop device.

11. The apparatus as in claim 10, wherein the process when executed is further operable to:
indicate to the next-hop device that the forwarded packets are part of a packet train.

12. The apparatus as in claim 10, wherein the process when executed is further operable to:
receive a final packet of the packet train, wherein the apparatus forwards the stored packets of the packet train to the next-hop device in response to receiving the final packet of the packet train.

13. The apparatus as in claim 10, wherein the process when executed is further operable to:
store a maximum amount of packets of the packet train, wherein the apparatus forwards the stored packets of the packet train to the next-hop device in response to storing the maximum amount of packets for the packet train; and
request to the source device that the source device buffer additional packets of the packet train.

14. A method, comprising:
operating a communication device according to a particular frequency hopping sequence in a communication network that is negotiated with a next-hop device independent of a transmit sequence used by the next-hop device to transmit to another device, wherein the particular frequency hopping sequence is not shared with the other device, and wherein the next-hop device is a half-duplex device that is not able to transmit and receive at the same time;
determining, by the communication device, an intention to generate a packet train, the packet train comprising a plurality of packets to be transmitted in succession to the next-hop device;
marking, by the communication device, a first packet of the packet train with an indication of the start of the packet train to cause the next-hop device to prevent forwarding of all packets in the packet train received by the next-hop device until reception of a final packet of the packet train;
marking, by the communication device, the final packet of the packet train with an indication of the end of the packet train;
transmitting, by the communication device, the packet train to the next-hop device using the particular frequency hopping sequence, each packet of the plurality of packets of the packet train transmitted in succession, and
remaining, by the communication device, on a same frequency of the particular frequency hopping sequence for a duration of the packet train.

15. The method as in claim 14, further comprising:
receiving, at the communication device, a request to buffer additional packets of the packet train prior to completion of transmitting the packet train; and
buffering, by the communication device, the additional packets of the packet train, in response to receiving the request to buffer the additional packets of the packet train.

16. The method as in claim 15, further comprising:
resuming, by the communication device, transmitting of the packet train in response to a trigger corresponding to one or more of: expiration of an indicated length of time in the request to buffer the additional packets or receipt of an explicit notice from the next-hop device to stop buffering the additional packets.

17. The method as in claim 14, further comprising:
marking, by the communication device, each packet of the packet train as belonging to the packet train.

18. The method as in claim 14, wherein the particular frequency hopping sequence is independent per device in the communication network.

19. An apparatus, comprising:
a processor;
a half-duplex transceiver configured to communicate in a frequency hopping communication network using a frequency hopping schedule that is negotiated with a next-hop device independent of a transmit sequence used by the next-hop device to transmit to another device, wherein the particular frequency hopping sequence is not shared with the other device, and wherein the next-hop device is a half-duplex device that is not able to transmit and receive at the same time; and a memory configured to store a process executable by the processor, the process when executed by the processor operable to:

determine an intention to generate a packet train, the packet train comprising a plurality of packets to be transmitted in succession to the next-hop device;

mark a first packet of the packet train with an indication of the start of the packet train to cause the next-hop device to prevent forwarding of all packets in the packet train until reception of a final packet of the packet train;

mark the final packet of the packet train with an indication of the end of the packet train;

transmit the packet train to the next-hop device using the particular frequency hopping sequence, each packet of the plurality of packets of the packet train transmitted in succession; and remain on a same frequency of the particular frequency hopping sequence for a duration of the packet train.

20. The apparatus as in claim 19, wherein the process when executed is further operable to:

receive a request to buffer additional packets of the packet train prior to completion of transmitting the packet train; and buffer the additional packets of the packet train, in response to receiving the request to buffer the additional packets of the packet train.

* * * * *